July 4, 1961 R. R. BARNES 2,991,353

AUTOMATIC FREQUENCY CONTROL FOR MULTI-TRANSMITTER RADIO SYSTEM

Filed March 3, 1959 2 Sheets-Sheet 1

INVENTOR
R. R. BARNES
BY
ATTORNEY

INVENTOR
R. R. BARNES
BY
ATTORNEY

United States Patent Office 2,991,353

Patented July 4, 1961

2,991,353

AUTOMATIC FREQUENCY CONTROL FOR MULTI-TRANSMITTER RADIO SYSTEM

Richard R. Barnes, Stirling, N.J., assignor to American Telephone and Telegraph Company, New York, N.Y., a corporation of New York Filed Mar. 3, 1959, Ser. No. 796,797

7 Claims. (Cl. 250—6)

This invention relates to radio systems in which several transmitters are required to provide adequate coverage of a service area and more particularly is directed to the problem of maintaining plural transmitters tuned to the same transmitting frequency.

It is found necessary in many radio communication systems to provide more than one radio transmitter in order to radiate an acceptable signal throughout a given service area. This problem often occurs in mobile telephone systems wherein several transmitters may be required to provide adequate coverage for communication with vehicles which may be anywhere within a city or other geographical area. Such multi-transmitter systems may be of particular importance in radio paging systems where pocket-carried receivers of relatively low over-all sensitivity are employed. The same problem may occur where broadcast transmitters in nearby cities are operated at the same carrier frequency with the same program material.

It has been common in such installations to interconnect the several transmitters and to designate one transmitter as the master transmitter and the remaining transmitters as satellites. It is usual to employ wire lines to deliver the message signals or program material from the site of the master transmitter to the sites of the satellite transmitters. It is obvious, however, that means must also be provided effectively to interconnect the several transmitters in such a way that all operate at the same carrier frequency. In previous arrangements, this has been acomplished through the use of wire lines and in some instances by radio links. However, so far as is known, all such arrangements have required additional facilities interconnecting the sites of the master and satellite transmitters so that continuous correction of the transmitting frequencies could be accomplished without interference with the communication service offered.

It is accordingly the object of the present invention to improve and simplify the facilities for maintaining frequency synchronization between the master and satellite transmitters of a multi-transmitter radio system.

In view of the above object, there is provided in accordance with the invention a radio system having a master transmitter and at least one satellite transmitter arranged for modulation by the same message signal. The arrangements for maintaining the carrier frequencies of the satellite and master transmitter the same include control circuitry at the master transmitter causing it to radiate unmodulated carrier when no message signal is present. Each satellite transmitter includes a receiver responsive to the unmodulated carrier and including a frequency sensitive element which may be adjusted in accordance with the received carrier frequency. When message information is present at the master transmitter, and thus at the several satellite transmitters, control circuitry disables the satellite receivers and applies, in each instance, a portion of the output of the satellite transmitter for comparison with the frequency held by the same frequency sensitive element. The difference, if any, between the two frequencies is then employed to adjust the frequency of the oscillator in the associated satellite transmitter.

The above and other features of the invention will be described in detail in the following specification taken in connection with the drawings in which.

Figure 1:
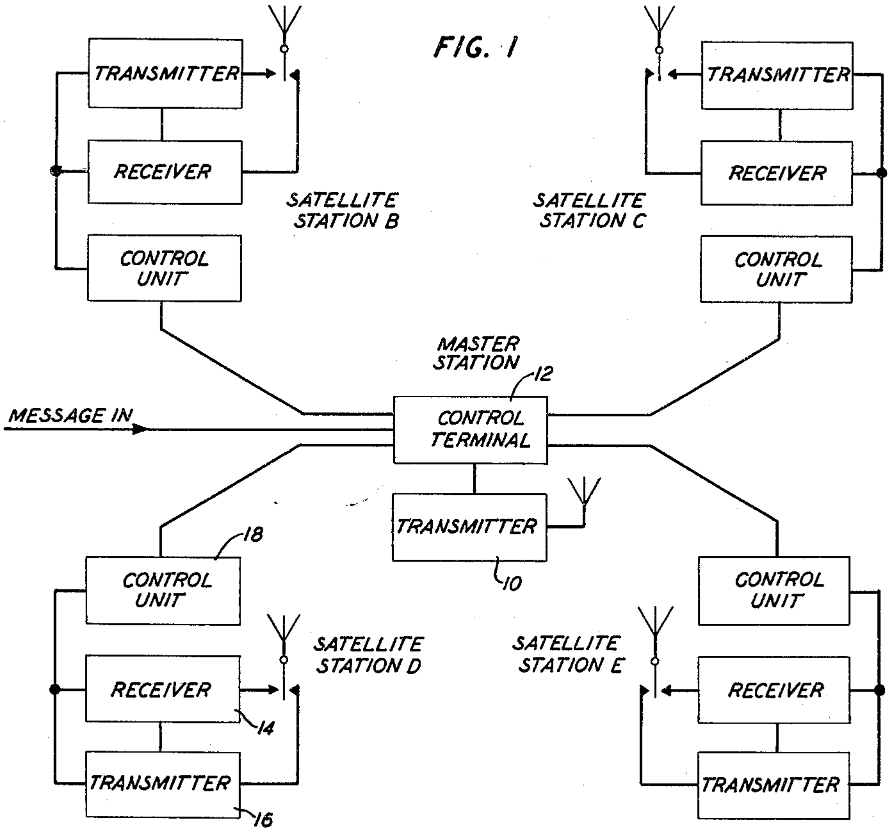
FIG. 1 is a block diagram of a radio system comprising a master transmitter and four satellite transmitters together with control arrangements according to the invention.

In a typical multi-transmitter radio system as shown in FIG. 1 there may be provided a master station and several satellite stations, here identified as stations B through E. The master station includes a transmitter 10 which may be of usual type and may, for example, be a conventional frequency modulation transmitter. Associated with transmitter 10 is a control terminal 12 to which are applied the message signals and which includes means for controlling transmitter 10 and in addition for routing the message signals to control units located at the satellite stations. Control terminal 12 may typically include facilities for remote control of transmitter 10 and, according to the present invention, is so arranged that transmitter 10 remains operative to radiate unmodulated carrier signals whenever the system is in operation but no message signal is present.

The satellite stations may all be the same and satellite station D will be taken as representative of the others. Here, there is provided a receiver 14, a transmitter 16, and a control unit 18. Control unit 18 is connected to control terminal 12 at the master station by a wire line or other equivalent facility. Over this connecting facility is transmitted the message signal which it is desired to have radiated simultaneously by the transmitter at the master station and that at the satellite station. Control unit 18 includes circuitry for applying the message signal as a modulating signal to transmitter 16 and in addition provides an output suitable for the operation of switching equipment whenever a message signal is present. This control signal is applied to both the receiver 14 and the transmitter 16 at the satellite station.

Figure 2:
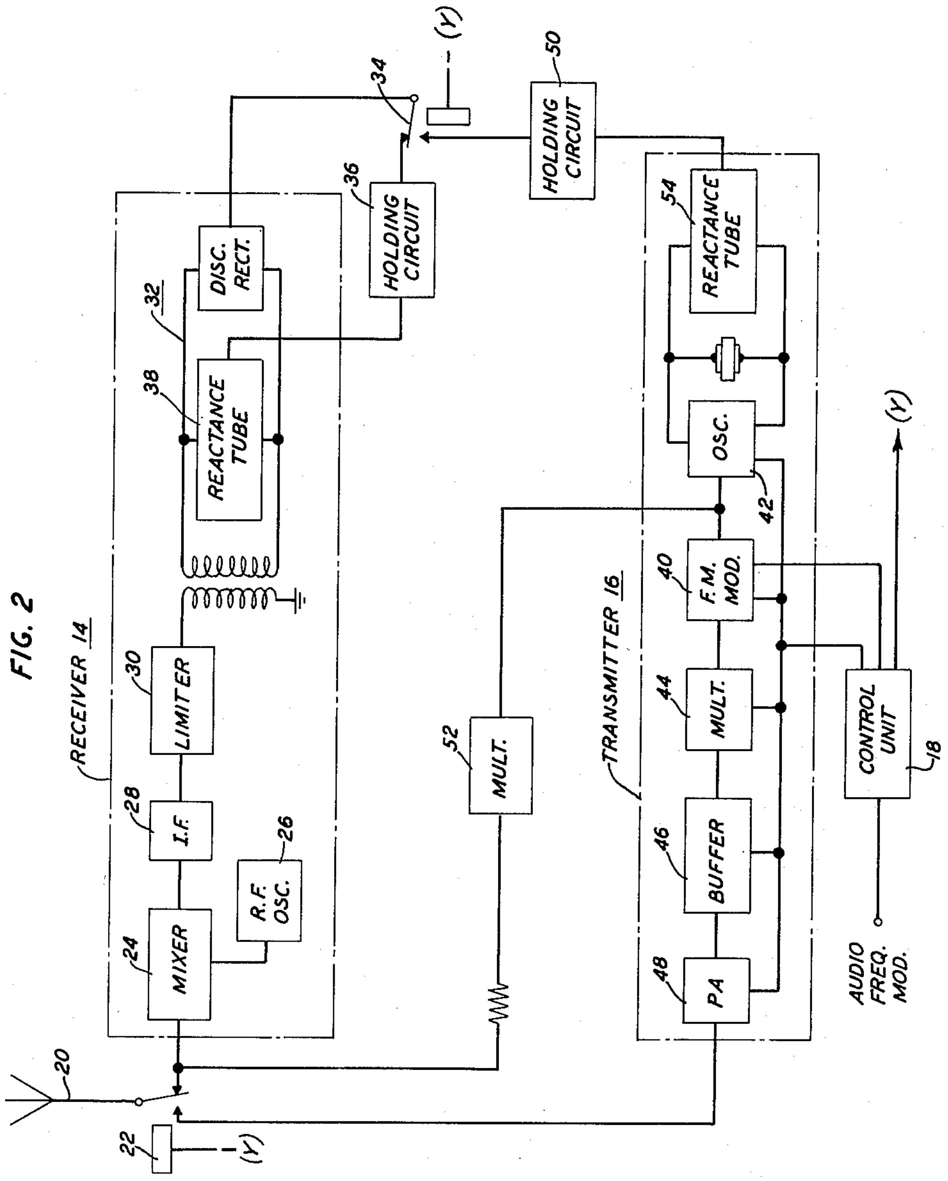
FIG. 2 is a schematic diagram partially in block form of the circuitry provided at the location of a satellite station.

The facilities provided at a satellite station may now be considered in greater detail with reference to the schematic diagram of FIG. 2. As shown in FIG. 2, an antenna 20 may be connected by way of the contacts of a switching relay 22 either to receiver 14 or transmitter 16. Normally, and as shown in FIG. 2, antenna 20 is connected to a mixer 24 of receiver 14 and the radio frequency signals received from the master transmitter are applied to the mixer. Mixer 24 forms the input circuit of a conventional radio receiver, here shown as a frequency modulation receiver. Also applied to the mixer circuit is the output of a radio frequency oscillator 26, the operating frequency of which is chosen in such a way as to yield an intermediate frequency of desired value for application to an intermediate frequency amplifier 28. The intermediate frequency wave is applied to a limiter 30 which removes all amplitude variations therein and thence to the input of a discriminator 32 of conventional configuration.

Discriminator 32 provides a direct current output whenever the intermediate frequency carried departs from the chosen intermediate frequency to which the discriminator is tuned. This output is normally applied through the contacts of a relay 34 to a circuit 36, designated as a holding circuit. For the moment, it is sufficient to state that the holding circuit is arranged to produce and store a direct current voltage, the amplitude and polarity of which correspond to the direction and extent in which the received intermediate frequency carrier has departed from the set frequency of discriminator 32. This output is applied as a control voltage to a variable reactance such as a reactance tube 38 contacted in shunt with the input circuitry of the discriminator and thus arranged to change the center frequency thereof. Other variable reactances such as variable capacitance diodes may also be employed.

Since it is expected that a message signal of the type normally employed in such systems will be intermittent in nature, it is recognized that any frequency control of the satellite stations will be equally intermittent in nature. Thus it is the function of the holding circuit 36 to produce and hold a correcting control signal such that discriminator 32 is retuned to a value corresponding to the carrier frequency radiated by the master transmitter during the intervals between modulation thereof by a message wave.

Also provided at the satellite station is a radio transmitter, here shown as a conventional frequency modulation transmitter comprising a frequency modulator 40, a crystal oscillator 42, a frequency multiplier 44, a buffer amplifier 46, and a power amplifier 48. Associated with the transmitter and receiver is control unit 18, the input of which is the modulating message signal transmitted thereto from the control terminal of the master station. As noted above, the output of the control unit includes, first, the message signal wave which is applied as a modulating input to frequency modulator 40 and, second, a control voltage which appears on lead (Y) and is applied to control relays 22 and 34, referred to heretofore.

Whenever audio or message frequency modulation is present at the input of control unit 18, it is applied to frequency modulator 40 and there modulated upon the carrier frequency output of oscillator 42 and applied through multiplier 44 and buffer amplifier 46 to power amplifier 48. At the same time, the control output of control unit 18 operates relays 22 and 34 to switch them from their normal to their operated position. Under these circumstances, antenna 20 is connected to the output of power amplifier 48, and the output of discriminator 32 of the receiver is connected to a circuit 50, which may be identical to holding circuit 36 and is also designated as a holding circuit.

When the frequency modulation transmitter is thus turned on, a portion of the output of oscillator 42 is applied through a frequency multiplier 52, having the same multiplication factor as multiplier 44, to the input of receiver 14. Thus it will be understood that there is applied to discriminator 32 of the receiver an intermediate frequency carrier, the frequency of which is determined by the frequency of oscillator 42 of the transmitter. If this frequency differs from the frequency to which discriminator 32 has previously been tuned upon receipt of unmodulated carrier from the master transmitter as outlined above, an output will appear at discriminator 32 and will be applied to circuit 50. This circuit is identical to holding circuit 36 and serves the same function. In this instance, however, the output of circuit 50 is applied to a reactance tube 54 which serves to control the frequency of oscillator 42 in the transmitter 16. Thus it will be understood that the frequency of oscillator 42 is determined by the frequency to which discriminator 32 has previously been tuned and that this frequency is held fixed during the period in which transmission from the associated satellite transmitter occurs by the control signal stored in circuit 36.

In similar fashion, when message signal information is absent, relays 22 and 34 return to their normal condition and discriminator 32 may again be set, if necessary, to a frequency corresponding to the frequency of the master transmitter. During this interval, the frequency of oscillator 42 is held by the control signal stored in holding circuit 50. It will be recognized from the above that a correcting signal is developed and held after the receiver discriminator has been tuned exactly to the frequency corresponding to that of the incoming signal. Thus no residual error signal is required to hold the frequency correction.

Figure 3:
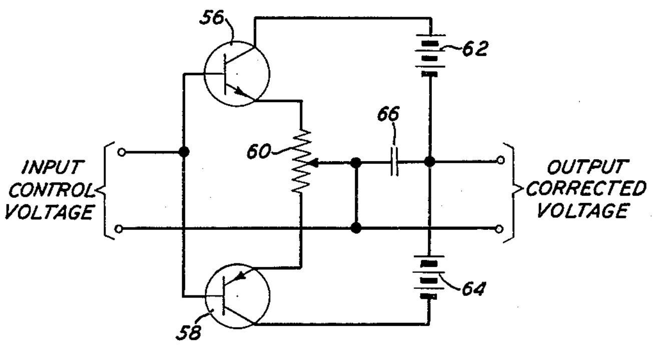
FIG. 3 is a circuit diagram of the holding circuits which appear in FIG. 2.

Details of the holding circuits 36 and 50 are shown in FIG. 3. Here, the input signal (derived from discriminator 32) is applied to the bases of two transistors 56 and 58, which are respectively n-p-n and p-n-p type units, the emitter-collector circuits of which are, with the winding of a potentiometer 60 and the batteries 62 and 64, connected in a four-arm bridge circuit. The output diagonal of this bridge includes a capacitor 66 connected between the junction common to batteries 62 and 64 and the slider of potentiometer 60. It will be recognized that regardless of the polarity of the input control voltage applied between the bases of transistors 56 and 58 and the emitters thereof by way of potentiometer 60, a potential of appropriate polarity will be developed across capacitor 66. This potential will thereafter be maintained unchanged unless either one or both of transistors 56 and 58 is rendered conducting. Thus the output of discriminator 32 of FIG. 2 will produce a control voltage of appropriate polarity and amplitude for the correction of the center frequency of the discriminator or of the frequency of oscillator 42 of the transmitter, as the case may be, and will hold this voltage until such time as a subsequent input voltage dictates a change therein.

Although the invention has been described as applied to a system wherein frequency modulation is employed, and has special advantages in such systems, it will be obvious that it may also be applied to multi-transmitter radio systems in which amplitude modulation is used. In such instances, modification of the message portions of the satellite transmitters would be required.

What is claimed is:

1. In a multi-transmitter radio system, a master transmitter, a plurality of satellite transmitters, and a control system for maintaining the radiated frequencies from all of said transmitters the same, comprising means at each satellite transmitter for receiving carrier signals from said master transmitter, means for applying message signals for radiation by all of said transmitters, means at the master transmitter for radiating unmodulated carrier when no message signal is present, a control circuit at each receiving means responsive only to receipt of unmodulated carrier to produce a control quantity representative of the carrier frequency of the master transmitter, and means for applying said control quantity to adjust the frequency of the associated satellite transmitters only when message signals are applied to said satellite transmitters.

2. In a radio system, a master transmitter, at least one satellite transmitter arranged for modulation by the same intermittent message signal as the master transmitter, and means for maintaining the carrier frequencies of the satellite and master transmitters the same, comprising means for comparing the frequency of unmodulated carrier as received from the master transmitter at said satellite transmitter with a predetermined frequency and producing a control signal when a difference between said frequencies exists, means for changing said predetermined frequency to eliminate said difference, means for storing the control voltage existing when a message signal is applied to said transmitters, means for comparing the carrier frequency of the satellite transmitter with the predetermined frequency as changed by said stored control voltage, and means operable in response to said comparison means for correcting the frequency of said satellite transmitter.

3. In a radio system, a master transmitter, at least one satellite transmitter arranged for modulation by the same message signal as said master transmitter, and means for maintaining the carrier frequencies of the satellite and master transmitters the same, comprising means causing said master transmitter to radiate unmodulated carrier when no message signal is present, receiving means at said satellite transmitter for said unmodulated carrier, including an element for producing and storing a control output whenever the frequency of said carrier differs from that to which said element is tuned, means responsive to said control output to tune said element to the received carrier frequency, and means effective when message signals are applied to said transmitters for adjusting the frequency of the satellite transmitter to the frequency to which said element is then tuned.

4. In a radio system, a master transmitter, at least one satellite transmitter arranged for modulation by the same message signal as the master transmitter, and means for maintaining the carrier frequencies of said satellite and master transmitters the same, comprising a radio receiver at the location of said satellite transmitter, means producing a control quantity representative of the carrier frequency reaching said receiver when unmodulated carrier is transmitted by said master transmitter, means for storing said control quantity when message signals turn on said satellite transmitter, and means responsive to said stored control quantity for adjusting the frequency of said satellite transmitter when it is turned on by a message signal.

5. In a radio system, a master transmitter, at least one satellite transmitter arranged for modulation by the same message signal as the master transmitter, and means for maintaining the carrier frequencies of said satellite and master transmitters the same, comprising a radio receiver at the location of said satellite transmitter, means producing a control quantity representative of the carrier frequency reaching said receiver when unmodulated carrier is transmitted by said master transmitter, means for storing said control quantity when message signals turn on said satellite transmitter, means for producing from said stored quantity a second quantity representative of the difference between the carrier frequency which produced said stored quantity and the frequency of the satellite transmitter, and means for adjusting the frequency of the satellite transmitter in accordance with said second control quantity.

6. In a radio system, a master transmitter and at least one satellite transmitter arranged for modulation by the same intermittent message signals as the master transmitter, and means for maintaining the carrier frequencies of the satellite and master transmitters the same, comprising a radio receiver at said satellite transmitter, said receiver including a discriminator normally tuned to a predetermined center frequency related to the frequency of said master transmitter, means rendering said receiver responsive to signals from said master transmitter only when unmodulated carrier is radiated thereby, means responsive to the output of said discriminator for producing and holding a control quantity representative of the difference between the received carrier frequency and said center frequency, means for adjusting the center frequency of said discriminator to match that corresponding to the received carrier, means operative when message signal information is applied to said satellite transmitter for comparing the center frequency then held in said discriminator with a frequency corresponding to the carrier frequency of said satellite transmitter, and a control circuit including said discriminator for adjusting the frequency of said satellite transmitter to reduce the result of said comparison to zero.

7. In a radio system, a master transmitter, a satellite transmitter, and a control system for maintaining the carrier frequencies of said transmitters the same, comprising means at the satellite transmitter for receiving carrier signals from said master transmitter, means for applying message signals for radiation by both of said transmitters, means at the master transmitter for radiating unmodulated carrier when no message signal is present, a control circuit at the receiving means of said satellite transmitter responsive only to receipt of unmodulated carrier to produce a control quantity representative of the carrier frequency of the master transmitter, and means for transferring said control quantity to adjust the frequency of the satellite transmitter only when a message signal is applied to the latter.

References Cited in the file of this patent

UNITED STATES PATENTS

| | | |
|---|---|---|
| 2,501,368 | White | Mar. 21, 1950 |
| 2,517,891 | Laeser | Aug. 8, 1950 |

OTHER REFERENCES

Article (1): "An All-Electronic Signal-Seeking Broadcast Receiver," by C. W. Hargens, IRE Trans. Broadcast and TV Receivers, pp. 5–9, October 1955.